Nov. 5, 1957
J. E. GALLO
2,811,788
SIMULATED RADIO NAVIGATION APPARATUS
Filed Aug. 3, 1951
3 Sheets-Sheet 1
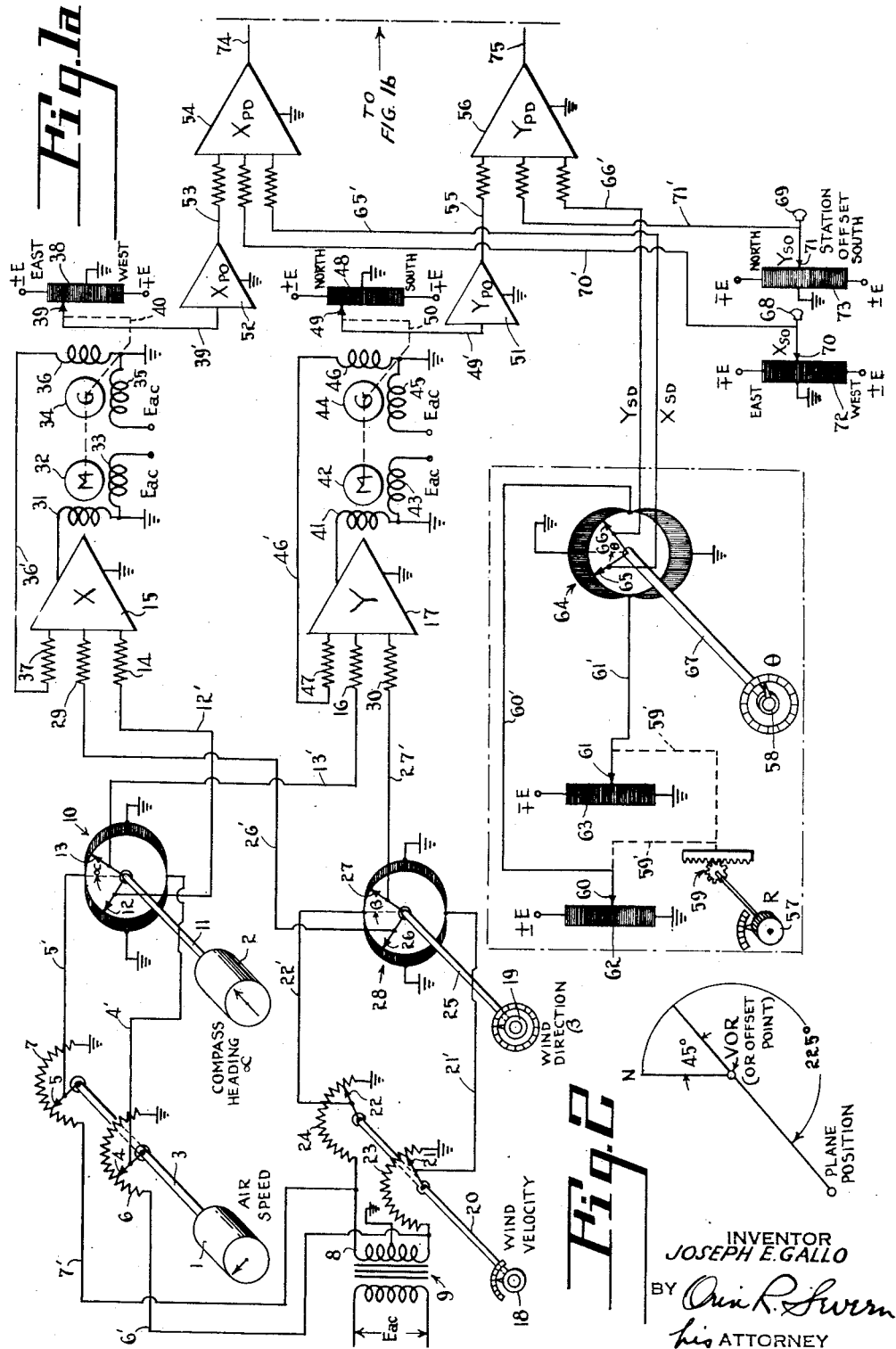
INVENTOR
JOSEPH E. GALLO
BY
his ATTORNEY Nov. 5, 1957 J. E. GALLO 2,811,788
SIMULATED RADIO NAVIGATION APPARATUS
Filed Aug. 3, 1951 3 Sheets-Sheet 2
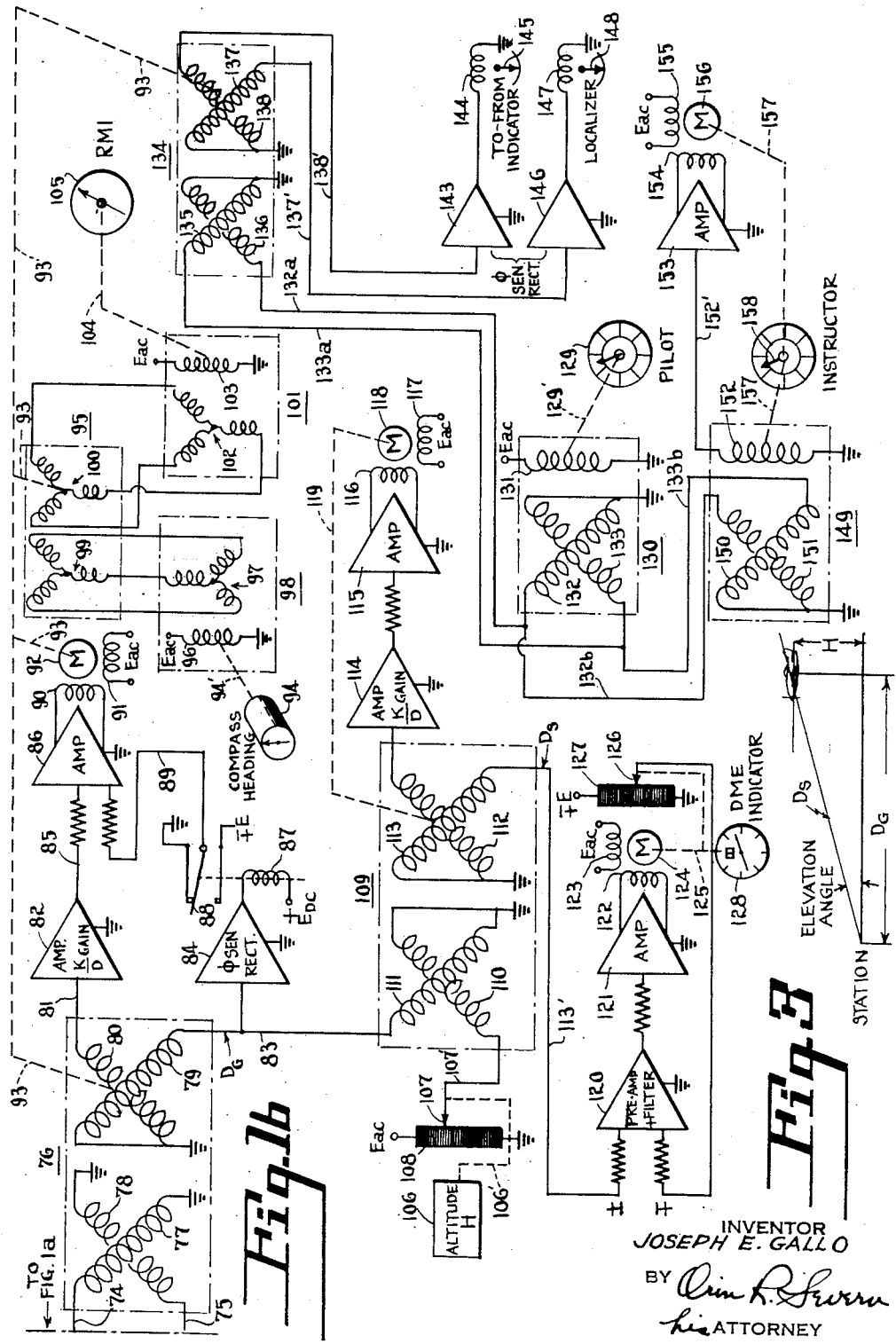
INVENTOR
JOSEPH E. GALLO
BY
his ATTORNEY Nov. 5, 1957  J. E. GALLO  2,811,788
SIMULATED RADIO NAVIGATION APPARATUS
Filed Aug. 3, 1951  3 Sheets-Sheet 3

INVENTOR.
JOSEPH E. GALLO
BY
HIS ATTORNEY

United States Patent Office 2,811,788
Patented Nov. 5, 1957

2,811,788

SIMULATED RADIO NAVIGATION APPARATUS

Joseph E. Gallo, Livingston, N. J., assignor to Curtiss-Wright Corporation, a corporation of Delaware Application August 3, 1951, Serial No. 240,133

11 Claims. (Cl. 35—10.2)

This invention relates to simulated radio navigation apparatus of the "visual-omnidirectional-range" (VOR) type and is useful in the ground training of aircraft personnel.

Radio navigation training apparatus of this character is disclosed in Dehmel Patent No. 2,560,527 granted July 10, 1951, for "Method of and Apparatus for Simulating Radio Navigation Aids."

The comparatively new VOR radio facility uses a very high frequency (VHF) transmitter which radiates signals for giving an infinite number of courses radiating from the radio station, as contrasted with the conventional low frequency A and N radio range which has but four radiating direction beams. In particular, a visual omnidirectional range is a radio transmitting station which provides a rotating cardioidal radiation pattern and a uniform phase reference signal that may be separately received on a craft and compared as to phase to indicate the bearing of the craft from the transmitting station. Radio receiving apparatus in the aircraft when tuned to a particular VOR station is designed to give a direct (or reciprocal) reading of the aircraft bearing with respect to the station without reference to the instant heading of the aircraft, i. e. the VOR receiver is position, not heading sensitive. In practice this station bearing may be coordinated with the aircraft magnetic compass heading in order to give both magnetic heading information and a direct pointer course to the station in the manner of well known automatic direction finder (ADF) apparatus. Furthermore this station bearing may be coordinated with distance measuring equipment (DME) for obtaining a "fix" on a single VOR station, the distance to the station being determined by the time required for a radio signal to travel from the plane to the station and return. In an alternative arrangement, the "radial," i. e. bearing from station to plane, to be flown is set into a so-called "radial selector" that is related to the vertical needle of the standard cross-pointer instrument to indicate deviation from the radial.

A particularly practical way of using the omnidirectional range in combination with DME has been proposed whereby offset course computing is greatly facilitated so that simply by determining known bearing and distance data from his maps, the pilot can set his computer and fly directly by pointer indication from any one point to another within the range of a given VOR station. Thus the pilot has both instrument indication of course deviation and the actual slant distance in miles to his destination. In addition, there is provided "ambiguity" information for indicating whether he is approaching or has passed his destination. As in the case of conventional A and N radio ranges, VOR stations are located at various positions about the country so that cross-country flying may be done by tracking on consecutive legs in respective omnidirectional ranges.

A principal object of this invention is to provide improved apparatus for simulating course and distance computing and indicating equipment of actual aircraft for ground training of aircraft personnel.

The invention will be more fully set forth in the following description referring to the accompanying drawings and the features of novelty will be pointed out with particularity in the claims annexed to and forming a part of this specification.

Referring to the drawings, Fig. 1a is a partly diagrammatic and schematic illustration of electrical means for producing control voltages representing instant positions of a simulated flight and reference positions in a Cartesian coordinate reference system;

Fig. 1b is a partly diagrammatic and schematic illustration of electrical resolving and computing means associated with the apparatus of of Fig. 1a for obtaining directional and distance information in a simulated flight;

Fig. 2 is a diagram for representing a course selector reading of 45° or 225°;

Fig. 3 is a diagram indicating the function of the altitude voltage in the computing system.

Figure 4:
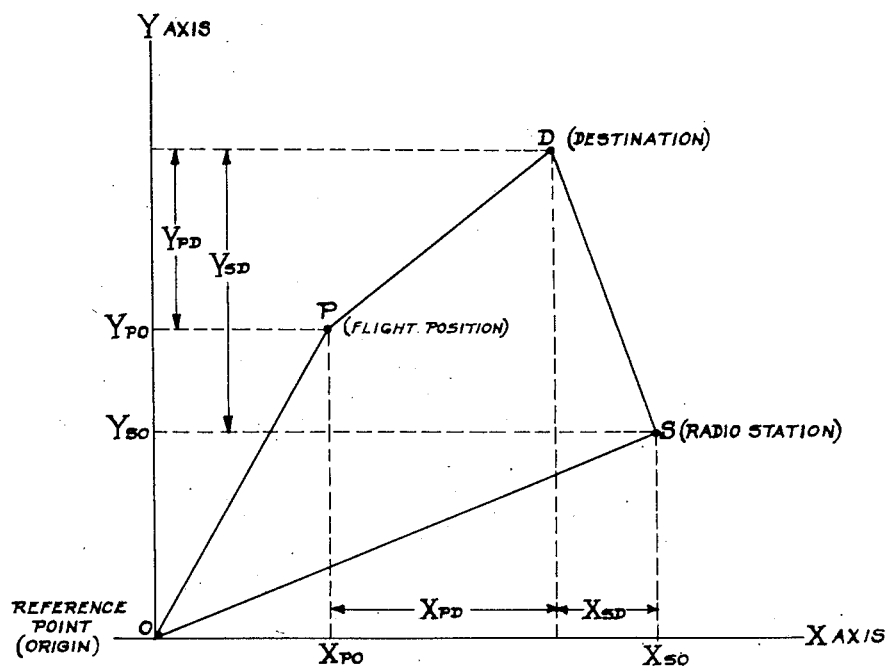
Fig. 4 is a graphical illustration of distance and bearing relationships between the origin, destination, radio station and flight positions.

Referring to Fig. 1a, means for representing the simulated flight may comprise a simulated airspeed indicator 1 and a simulated compass 2 for indicating the compass heading of the airplane. These instruments are suitably used for deriving control quantities, such as alternating current (A. C.) voltages for use in the flight computing system hereinafter described. The airspeed indicator 1 is shown as connected by a shaft 3 to a pair of slider contacts 4 and 5 of the potentiometers 6 and 7 respectively for deriving control voltages. The potentiometers are each grounded at one terminal as indicated and the other terminals are connected by conductors 6' and 7' to sources of oppositely phased voltages, specifically the opposite terminals of the secondary winding 8 of a transformer 9. The primary winding of the transformer is energized by a reference A. C. voltage $E_{ac}$ and the secondary winding is provided with a grounded center tap for producing oppositely phased voltages at the secondary terminals.

The compass indicator 2 operates a potentiometer 10 through a shaft 11 that has secured thereto slider contacts 12 and 13 spaced 90° apart. The upper and lower terminals of this potentiometer, which is of the cosinusoidal type, are connected by conductors 5' and 4' as indicated to the sources of oppositely phased derived voltages at sliders 5 and 4 respectively. The mid-sections of the potentiometer 10 are grounded as indicated so that, considering the vertical line through the center of the potentiometer as the North reference position, the slider 13 derives a voltage corresponding to the cosine of angle $\alpha$ representing the compass heading, and the slider 12 derives a voltage corresponding to sine $\alpha$. The sine voltage from slider 12 is connected through conductor 12' and proportioning resistance 14 to the input of a summing X amplifier 15, and the cosine voltage at slider 13 is connected by conductor 13' and proportioning resistance 16 to the input of a summing Y amplifier 17. The summing amplifiers X and Y are connected to integrating means hereinafter described for representing the instant flight position with respect to coordinates X and Y of a Cartesian coordinate reference system.

The flight position is corrected for simulated wind drift by means of instructor controlled dials 18 and 19 representing respectively wind velocity and wind direction $\beta$. The wind velocity dial 18 is connected by a shaft 20 to slider contacts 21 and 22 of the potentiometers 23 and 24 respectively. As in the case of the airspeed potentiometers, these potentiometers are each grounded at one terminal and are energized at the other by oppositely phased A. C. voltages from the transformer secondary winding 8. The wind direction dial 19 is connected by a shaft 25 to the sliders 26 and 27 of a cosinusoidal potentiometer 28 similar to the heading potentiometer 10 for deriving voltages at sliders 26 and 27 representing respectively sine and cosine values of angle $\beta$. The sine voltage is fed by conductor 26' to the input resistor 29 of the X amplifier 15 and the cosine voltage is fed by conductor 27' to the input resistor 30 of the Y amplifier 17.

The integrating means for the X velocity voltages comprises motive means for adjusting a potentiometer according to the output of amplifier 15. The output energizes a winding 31 of a two-phase A. C. motor 32 having a second winding 33 energized by a reference voltage $E_{ac}$. The motor is connected as indicated to a feedback two-phase A. C. generator 34 having a reference winding 35 and a winding 36 for generating a feedback voltage that is led by conductor 36' to the input of amplifier 15 at resistor 37. The motor 32 is conventionally operated in direction according to the phase of the voltage in the winding 31 with respect to the reference voltage and at a speed according to its magnitude for positioning the slider contact 39 of the X position potentiometer 38 by means of a connection indicated at 40. The potentiometer 38 has a grounded center tap and is energized at its upper and lower terminals by oppositely phased A. C. voltages as indicated.

The integrator for the Y velocity voltages is essentially the same, the output of amplifier 17 energizing the winding 41 of motor 42 which has a reference winding 43. The feedback generator 44, having windings 45 and 46, is connected by conductor 46' to the input resistor 47 of the amplifier 17 for feedback purposes, and the slider contact 49 of the Y position potentiometer 48 is adjusted by the motor through connection 50. The derived voltage at slider 49 is connected by conductor 49' to the input of amplifier 51, the output of which represents the Y coordinate $Y_{po}$ of the airplane position relative to the reference origin as graphically shown by Fig. 4. Similarly, the derived voltage at slider 39 of the X potentiometer is fed by conductor 39' to the input of amplifier 52, the output of which represents the X coordinate $X_{po}$ of the airplane position with respect to the reference origin. The output of amplifier 52 is fed by conductor 53 to the summing amplifier 54, the output of which represents the X coordinate of the airplane position relative to the the VOR station (or to an offset point as hereinafter described), and the output of amplifier 51 is fed by conductor 55 to the summing amplifier 56, the output of which represents the Y coordinate of the airplane position with respect to the station or offset point.

For shifting the axes of the coordinate system to the VOR station, the instructor adjusts the sliders 70 and 71 of potentiometers 72 and 73 by manual means 68 and 69 so as to derive voltages $X_{so}$ and $Y_{so}$ representing the coordinate offsets, Fig. 4, of the VOR station relative to the reference orgin. These voltages are led by conductors 70' and 71' to the summing amplifiers 54 and 56 respectively. Accordingly, the voltage outputs $X_{pd}$ and $Y_{pd}$ of these amplifiers at conductors 74 and 75 respectively (assuming that the R–$\theta$ amplifier inputs are zero), represent the algebraic sums of the aforesaid X and Y position coordinates and the above offset coordinates; and the resulting summed values in turn represent the coordinates of the airplane relative to the VOR station, i. e. the destination point when the pilot is "homing" on the station.

In the case of offset course computing, the so-called R–$\theta$ system may be used. In this case, the airplane flies from an original or starting point to a destination point that is offset with respect to a straight line joining the VOR station and the starting point. The inputs to the computing system for this situation include an R voltage representing the measured map distance from the VOR station to the destination or offset point, and a $\theta$ voltage representing the bearing of the offset point from the VOR station. For this purpose R dial 57 and the $\theta$ dial 58 are adjustable by the navigator according to the aforesaid determinable values that can be obtained directly from his map. The dial 57 is suitably connected, as through a pinion and rack 59 and connections 59', to the slider contacts 60 and 61 of linear potiometers 62 and 63. The potentiometers are energized as indicated by oppositely phased voltages and the derived voltages are led by conductors 60' and 61' to the opposite terminals of a cosinusoidal potentiometer 64 of the character above-referred to. The 90° spaced slider contacts 65 and 66 are positioned as indicated by the shaft 67 of the $\theta$ dial and the derived sine and cosine voltages are led by conductors 65' and 66' to the summing amplifiers 54 and 56 respectively. These derived voltages $X_{sd}$ and $Y_{sd}$ represent the legs of a right triangle, Fig. 4, defining the X and Y coordinate values of the VOR station with respect to the offset point. Accordingly, when the X and Y position coordinate voltages, the VOR station-origin voltages and the offset point-VOR station voltages are all algebraically summed at the amplifiers 54 and 56, the summed voltages represent the coordinates $X_{pd}$ and $Y_{pd}$ of the airplane relative to the offset point or destination.

Summarizing, the relationship between the various coordinates may be expressed algebraically as:

$$X_{pd} = X_{so} - X_{po} + X_{sd}$$

and $$Y_{pd} = Y_{so} - Y_{po} + Y_{sd}$$

where $X_{pd}$, $Y_{pd}$ are coordinates of the flight position relative to the destination, $X_{so}$, $Y_{so}$ are coordinates of the radio station relative to the reference point or origin, $X_{po}$, $Y_{po}$ are the coordinates of the flight position relative to the origin and $X_{sd}$, $Y_{sd}$ are the coordinates of the radio station relative to the destination. These relationships are clearly illustrated in Fig. 4.

Referring now to Fig. 1b, the output voltages on conductors 74 and 75 are fed to a resolver, such as a rotary transformer 76. The fixed primary windings 77 and 78 are connected to the conductors 74 and 75 respectively and are arranged in quadrature as indicated. The relatively movable secondary quadrature winding comprises windings 79 and 80 arranged to be rotatably positioned as a unit to a position representing the bearing of the aircraft with respect to the destination point in a manner hereinafter described. The induced voltage in winding 80 is led by conductor 81 to an amplifier 82 having a variable gain $$\frac{K}{D}$$

where D is the distance to be flown, and the winding 79 is connected by conductor 83 to a phase sensitive rectifier 84. The output of amplifier 82 is fed by conductor 85 to a motor amplifier 86, and the output of the phase sensitive rectifier energizes a D. C. relay coil 87 for controlling the relay switch 88 that in turn is connected by conductor 89 to the input of the motor amplifier 86. In the position shown, the switch is grounded, thus normally grounding the amplifier input, and when the relay is energized a phased A. C. voltage is connected to the amplifier input for controlling the bearing servomotor as presently described.

The output of the motor amplifier 86 energizes the control winding 90 of a two-phase A. C. bearing servomotor 92 having a reference winding 91 as previously described. The motor is mechanically connected as indicated at 93 to the rotary secondary winding of the transformer 76 and is energized so as to rotate the secondary winding in a direction tending to reduce the induced voltage in winding 80 to zero. This zero position represents the bearing of the aircraft with respect to the destination point as above described. The motor connection 93 extends also to a synchronous transmitter 95 and a rotary transformer or resolver 134 presently described.

Since the bearing servomotor 92 would ordinarily be insensitive to very small voltages induced in winding 80, precise zero positioning of the winding is obtained by the variable gain amplifier 82 in combination with the relay 87. That is, the gain of the amplifier is inversely related to distance D so that the gain is large when the flight is very close to the station, thereby preventing sluggish operation or stalling of the motor. In addition, the phase sensitive rectifier 84 is responsive to a very small distance voltage from the winding 79 to operate the relay 87 and introduce a voltage for "kicking" the motor over to the zero position. Specifically, this "kicking" or "flip" circuit functions as follows: since the $x$, $y$ voltages approach zero as the VOR station is approached by the simulated flight, there is insufficient signal available to position the bearing servo 92 while passing over the station. On the other side of ground zero the voltage $D_g$ changes in polarity, and this phase change causes the relay 87 to become energized, thereby connecting the voltage source $\mp E$ to the amplifier 86 for kicking the bearing servo over to the point of stable equilibrium. The voltage $D_g$ will then reverse to correct polarity and the relay 87 will be de-energized to disconnect the aforesaid voltage source.

The resolver-transmitter 95 is energized according to the positioning of a simulated compass 94, which may be the same as the compass 2 of 1a, and also according to the positioning of the bearing servomotor 92. The compass is connected through a connection 94' to a rotary primary coil 96 that is energized by a reference voltage $E_{ac}$ for inducing variable voltages in the fixed three-phase secondary winding 97 of the rotary transformer 98. The winding 97 is connected to a similar three-phase fixed winding 99 constituting the primary winding of a resolving transformer having as its secondary the rotary transmitter winding 100 that is positioned by the bearing servomotor 92. The transmitter winding is connected to the receiver 101 so that the voltages induced in the transmitter winding 100 energize the corresponding windings of the fixed receiver winding 102. The secondary winding 103 of the receiver is energized by the reference voltage $E_{ac}$ and is rotatable by magnetic forces to an angular position corresponding to the angular difference in the positions of the compass coil 96 (aircraft heading) and the transmitter coil 100 that is adjustable by the bearing servomotor (destination to aircraft bearing), thereby to a position through a connection 104 an indicating instrument 105 representing a radio magnetic indicator (RMI) as shown.

Referring back to the resolver 76, the secondary winding 79 is also connected by conductor 83 to means for computing the slant distance $D_s$ of the instant flight position to the station or destination point, Fig. 3. To this end, an altitude servo or the like 106 operates through a connection 106', the slider contact 107 of a potentiometer 108 for deriving an A. C. voltage representing the altitude H of the simulated flight. The slider 107 is connected by conductor 107' to the winding 110 forming part of the fixed primary quadrature winding of a rotary transformer or resolver 109. The other primary winding 111 is connected by conductor 83 to the resolver 76 previously referred to. The secondary quadrature winding comprises windings 112 and 113 and is rotatable as a unit with respect to the primary by a two-phase positioning motor 118. This motor is energized according to the induced voltage in the winding 112 through an amplifier 114 also having a gain $$\frac{K}{D}$$

and a motor amplifier 115, the output of which energizes the motor winding 116. The other motor winding 117 is energized by the reference voltage as indicated. The above connections are such that the motor 118 tends to rotate through connection 119 the secondary winding in a direction tending to reduce to zero the voltage induced in winding 112. As in the case of the bearing servomotor 92, the variable gain amplifier 114 serves to insure precise zero positioning of the secondary windings 112—113 by the motor 118 for obtaining the slant distance voltage $D_s$ that in turn operates the DME indicator.

In this zero position, the voltage induced in the other winding 113 representing slant distance $D_s$ is fed by conductor 113' to a pre-amplifier and filter 120, the output of which energizes the motor amplifier 121 that in turn energizes the motor winding 122 of the two-phase positioning motor 124. The reference winding 123 of this motor is energized as indicated by the reference voltage $E_{ac}$. The motor 124 operates through a connection 125 the slider contact 126 of the "answer" potentiometer 127 for deriving a positioning voltage for input to the amplifier 120. The motor connection 125 also operates an indicator 128 representing distance measuring equipment (DME) indicator. Thus the voltage representing the horizontal or ground distance $D_g$ from the flight position to the destination (or station) appearing on winding 111 of the resolver 109, and the voltage representing flight altitude H on the winding 110 are used to compute the actual slant distance $D_s$ as indicated in Fig. 3. The computation of this slant distance is important, particularly in a case where the aircraft is comparatively near its destination, since an indicated horizontal distance would be erroneous and misleading to a material extent.

In addition to the DME indicator, other indications are provided for guiding the pilot to his destination including the conventional localizer cross-pointer needle 148, and a "to-from" or ambiguity indicator 145. These indications of course depend upon the course selected by the pilot and to this end a course selector dial 129 operable by the pilot is adapted to rotate the primary winding 131 of a resolver or rotary transformer 130 through a suitable connection 129'. The winding 131 which is energized by the reference voltage $E_{ac}$ constitutes the primary of a transformer having as its secondary a fixed quadrature winding consisting of windings 132 and 133.

Assuming that the winding 131 is rotated through an angle to a position corresponding to the selected course direction, the voltages induced in the secondary windings 132 and 133 energize the fixed quadrature primary windings 135 and 136 of another resolver 134 through conductors 132a and 133a. The relatively movable secondary winding is arranged to be angularly adjusted by the bearing servomotor 92 through connection 93 and consists of the quadrature windings 137 and 138. The voltage induced in winding 137 which represents course deviation is led by conductor 137' to a phase-sensitive rectifier 146, the output of which energizes the coil 147 of the localizer cross-pointer needle 148. The voltage induced in winding 138 which represents distance is led by conductor 138' to the phase-sensitive rectifier 143, the output of which energizes the coil 144 of the "to-from" or ambiguity indicator 145. When the flight is represented as being "on course" the course deviation voltage induced in the winding 137 of the resolver 134 is zero and the localizer needle is centered. The voltage induced in the winding 138 which corresponds to distance reverses in phase when the aircraft is represented as passing beyond the station or destination thereby operating the to-from indicator in corresponding manner. Specifically, referring to Fig. 2, with the cross-pointer 148 at zero on course selector settings of either 45° or 225°, the to-from indicator reads "To" at the 45° setting, and reads "From" at the 225° setting for the plane position indicated.

The instructor is informed as to the pilot's course selection by a follow-up indicator 158 remotely located at his station. This indicator may be operated in any suitable manner as by a resolver 149 and automatic positioning motor 156. The fixed quadrature winding of resolver 149 consisting of windings 150 and 151 is energized by the output voltages from resolver 130 through the conductors 132b and 133b. The rotary secondary winding 152 is arranged to be automatically positioned by the motor 156 through a mechanical connection 157 which also positions the instructor's indicator 158. The motor 156, which is of the two-phase type having a control winding 154 and a reference winding 155, is adapted to be controlled by the voltage induced in the winding 152 led by conductor 152' to the motor amplifier 153 for rotating the winding 152 in a direction tending to reduce the induced voltage to zero. In the zero position the instructor's indicator corresponds with the pilot's course selector 129.

It should be understood that this invention is not limited to specific details of construction and arrangement thereof herein illustrated, and that changes and modifications may occur to one skilled in the art without departing from the spirit of the invention.

What is claimed is:

1. Training apparatus for simulating radio navigation with reference to a destination along a course offset with respect to a radio range reference station comprising means for deriving control signals representing the coordinates of instant position of a simulated flight relative to an origin point, means initially adjustable according to the position of said reference station relative to said origin for obtaining control signals representing station offset coordinates relative to said origin, means initially adjustable according to the position of said destination relative to said station for deriving control signals representing coordinates of said station relative to said destination, means jointly responsive to all said control signals for obtaining resultant control signals representing coordinates of the flight position relative to said destination, and resolving means responsive to said resultant control signals for deriving a signal representing a simulated navigational condition with reference to said destination.

2. Training apparatus for simulating radio navigation between two points defining a course offset with respect to a radio range reference station comprising means for deriving control signals representing the coordinates of instant position of a simulated flight relative to an origin point, means initially adjustable according to the position of said station relative to said origin for obtaining control signals representing station offset coordinates relative to said origin, means initially adjustable according to the bearing from said station to said destination and to the distance from said station to destination for deriving control signals representing coordinates of said station relative to destination, means jointly responsive to all said control signals for obtaining resultant control signals representing coordinates of the flight position relative to destination, a simulated course selector adjustable by the pilot for representing the desired flight course, and resolving and indicating means jointly controlled by and in accordance with said resultant signals and said course selector for indicating the extent of deviation from said course.

3. Training apparatus for simulating radio navigation between two points defining a course offset with respect to a radio range reference station comprising means for deriving voltages representing the coordinates of instant position of a simulated flight relative to an origin point, means initially adjustable according to the position of said station relative to said origin for obtaining voltages representing station offset coordinates relative to said origin, means initially adjustable according to the bearing from said station to said destination and to the distance from said station to destination for deriving voltages representing coordinates of said station relative to destination, means jointly responsive to all said voltages for obtaining potential representing coordinates of the flight position relative to destination, means responsive to said potential for indicating the distance from said flight to destination, a simulated course selector adjustable by the pilot for representing the desired flight course, and resolving and indicating means jointly controlled by and in accordance with said last-named potential and said course selector for indicating the extent of deviation from said course.

4. Training apparatus for simulating radio navigation between two points defining a course offset with respect to a radio range reference station comprising means for deriving A. C. voltages representing the coordinates of instant position of a simulated flight relative to an origin point, means initially adjustable according to the position of said station relative to said origin for obtaining A. C. voltages representing station offset coordinates relative to said origin, means initially adjustable according to the bearing from said station to said destination and to the distance from said station to destination for deriving A. C. voltages representing coordinates of said station relative to destination, means jointly responsive to all said voltages for obtaining A. C. potential representing coordinates of the flight position relative to destination, a rotary magnetic resolver responsive to said potential for computing the bearing of destination relative to said flight, means for representing the flight altitude, resolving means jointly responsive to said altitude means and said magnetic resolver, and indicating means responsive to said resolving means for representing a DME indicator.

5. Training apparatus for simulating radio navigation between two points defining a course offset with respect to a radio range reference station comprising means for deriving A. C. voltages representing the coordinates of instant position of a simulated flight relative to an origin point, means initially adjustable according to the position of said station relative to said origin for obtaining A. C. voltages representing station offset coordinates relative to said origin, means initially adjustable according to the bearing from said station to said destination and to the distance from said station to destination for deriving A. C. voltages representing coordinates of said station relative to destination, means jointly responsive to all said voltages for obtaining A. C. potential representing coordinates of the flight position relative to destination, a rotary magnetic resolver including a servo-positioned secondary winding responsive to said potential, variable gain amplifying means responsive to potential induced in said secondary winding for energizing said servo so that it tends to assume a position representing the bearing of destination relative to said flight, said servo also being responsive to the phase of another potential induced in said secondary winding representing distance from flight to destination whereby said servo is operated to equilibrium position when the flight reaches said destination, and indicating means responsive to said last-named potential for representing said distance.

6. In a training system for simulating radio navigation between two points defining a course offset with respect to a radio range reference station, apparatus for computing flight-to-destination distance values which comprises means for deriving control signals representing Cartesian x and y coordinates of instant position of the simulated flight relative to an origin point, means for deriving control signals representing the offset x and y coordinates of said station relative to said origin point, means for deriving a control signal according to magnitude of the distance between said station and the destination point, resolving means responsive to said distance signal and adjustable through an angle representing a bearing angle from said station to said destination point for obtaining control signals representing the Cartesian x and y coordinates of said station relative to the destination point, means for summing algebraically the aforesaid flight position and station offset and station-destination control signals for the x and y axes respectively for in turn obtaining resultant control signals representing the x and y coordinates of the flight position relative to said destination, resolving means energized by said resultant signals and adjustable through an angle representing the destination bearing from the flight position for obtaining a control signal representing the magnitude of the ground distance from the flight position to destination, means for deriving a control signal representing the altitude of the simulated flight, resolving means responsive to said ground distance and altitude signals for producing a signal representing slant distance, and distance indicating means responsive to said last-named signal.

7. In a training system for simulating radio navigation between two points defining a course offset with respect to a radio range reference station, electrical apparatus for computing flight-to-destination distance values which comprises means for deriving a pair of voltages representing Cartesian x and y coordinates of instant position of the simulated flight relative to an origin point, means for deriving a pair of voltages representing the offset x and y coordinates of said station relative to said origin point, means for deriving potential according to magnitude of the distance between said station and the destination point, resolving means energized by said distance potential and adjustable through an angle representing a bearing angle from said station to said destination point for obtaining voltages representing the Cartesian x and y coordinates of said station relative to the destination point, amplifying means for summing algebraically the aforesaid flight position and station offset and station-destination voltages for the x and y axes respectively for in turn obtaining voltages representing the x and y coordinates of the flight position relative to said destination, Cartesian-to-polar-coordinate resolving means energized by said last-named voltages and adjustable through an angle representing the destination bearing from the flight position for obtaining potential representing the magnitude of the ground distance from the flight position to destination, means for deriving a voltage representing the altitude of the simulated flight, resolving means energized by said ground distance and altitude voltages for producing a potential representing slant distance, and distance indicating means responsive to said last-named potential.

8. In a training system for simulating radio navigation between two points defining a course offset with respect to a radio range reference station, electrical apparatus for computing flight-to-destination distance values which comprises means for deriving voltages representing Cartesian x and y coordinates of instant position of the simulated flight relative to an origin point, means for deriving voltages representing the offset x and y coordinates of said station relative to said origin point, means for deriving potential according to magnitude of the distance between said station and the destination point, resolving means energized by said distance potential and adjustable through an angle representing a bearing angle from said station to said destination point for obtaining voltages representing the Cartesian x and y coordinates of said station relative to the destination point, means for summing algebraically the aforesaid flight position and station offset and station-destination voltages for the x and y axes respectively for in turn obtaining voltages representing the x and y coordinates of the flight position relative to said destination, Cartesian-to-polar-coordinate resolving means energized by said last-named voltages and including a servomotor adjustable through an angle representing the destination bearing from the flight position for obtaining potential representing the magnitude of the ground distance from the flight position to said destination point, means for deriving a voltage representing the altitude of the simulated flight, resolving means energized by said ground distance and altitude voltages for producing a potential representing slant distance, distance indicating means responsive to said last-named potential and additional resolving means jointly responsive to the positioning of said servomotor and to simulated compass heading for controlling an indicator representing a radio magnetic indicator.

9. In a training system for simulating radio navigation between two points defining a course offset with respect to a radio range reference station, electrical apparatus for computing flight-to-destination distance and course deviation values which comprises means for deriving voltages representing Cartesian x and y coordinates of instant position of the simulated flight relative to an origin point, means for deriving voltages representing the offset coordinates of said station relative to said origin point, means for deriving potential according to magnitude of the distance between said station and the destination point, resolving means energized by said distance potential and adjustable through an angle representing a bearing angle from said station to said destination point for obtaining voltages representing the Cartesian x and y coordinates of said station relative to the destination point, means for summing algebraically the aforesaid flight position and station offset and station-destination voltages for the x and y axes respectively for in turn obtaining voltages representing the coordinates of the flight position relative to said destination, resolving means energized by said last-named voltages including servo means adjustable to a position representing the destination bearing from the flight position, means adjustable to represent a pilot's course selector, resolving means responsive jointly to said servo means and to said course selector means, and indicating means responsive to said last-named resolving means for representing ambiguity and localizer cross-pointer indicators respectively.

10. In a training system for simulating radio navigation between two points defining a course offset with respect to a radio range reference station, electrical apparatus for computing flight-to-destination distance values which comprises means for deriving A. C. voltages representing Cartesian x and y coordinates of instant position of the simulated flight relative to an origin point, means for deriving A. C. voltages representing the offset coordinates of said station relative to said origin point, means for deriving A. C. potential according to magnitude of the distance between said station and the destination point, resolving means energized by said distance potential and adjustable through an angle representing a bearing angle from said station to said destination point for obtaining A. C. voltages representing the x and y coordinates of said station relative to the destination point, amplifying means for summing algebraically the aforesaid flight position and station offset and station-destination voltages for the x and y axes respectively for in turn obtaining A. C. voltages representing the coordinates of the flight position relative to said destination, Cartesian-to-polar-coordinate resolving means, including a rotary transformer energized by said last-named voltages and having a secondary winding adjustable by servo means in response to potential induced in said secondary through an angle representing the destination bearing from the flight position, said secondary also producing another A. C. potential representing the magnitude of the ground distance from the flight position to said destination point, means for deriving an A. C. voltage representing the altitude of the simulated flight, resolving means including a rotary transformer energized by said ground distance and altitude voltages and having a secondary winding adjustable by servo means responsive to potential induced in said secondary through an angle representing the flight elevation angle from destination, said secondary also producing an A. C. potential representing slant distance, and distance indicating means responsive to said last-named potential.

11. Training apparatus for simulating radio navigation with reference to a destination along a course offset with respect to a radio range reference station comprising means for deriving control voltages representing the coordinates of instant position of a simulated flight relative to an origin point, means initially adjustable according to the position of said reference station relative to said origin for obtaining control voltages representing station offset coordinates relative to said origin, means initially adjustable according to the position of said destination relative to said station for deriving control voltages representing coordinates of said station relative to said destination, means jointly responsive to all said control voltages for obtaining resultant control voltages representing coordinates of the flight position relative to said destination, resolving means responsive to said resultant control voltages for deriving a signal representing the absolute bearing with reference to said destination, a simulated course selector operable by the pilot for producing a signal representing the desired course, and means jointly responsive to said signals for producing signals representing relative position and direction of the flight with reference to said destination.

References Cited in the file of this patent

UNITED STATES PATENTS

| | | |
|---|---|---|
| 2,465,624 | Agins | Mar. 29, 1949 |
| 2,471,315 | Dehmel | May 24, 1949 |
| 2,475,314 | Dehmel | July 5, 1949 |
| 2,497,216 | Greenough | Feb. 14, 1950 |
| 2,560,527 | Dehmel | July 10, 1951 |
| 2,560,528 | Dehmel | July 10, 1951 |
| 2,685,747 | Hicken | Aug. 10, 1954 |

OTHER REFERENCES

Aero Digest, November 1950, pages 70, 79, 80, 82, 83.